United States Patent
McVerry et al.

(10) Patent No.: US 6,285,672 B1
(45) Date of Patent: *Sep. 4, 2001

(54) METHOD AND SYSTEM FOR ACHIEVING IMPROVED DATA TRANSMISSION THROUGH THE PUBLIC SWITCHED TELEPHONE NETWORK

(75) Inventors: Francis McVerry, Rancho Santa Margarita; Burk William Beadle, Irvine, both of CA (US)

(73) Assignee: Rockwell Semiconductor Systems, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/931,033

(22) Filed: Sep. 16, 1997

(51) Int. Cl.⁷ .......................... H04L 12/50; H04L 12/28; H04L 12/56
(52) U.S. Cl. ............................ 370/359; 370/399
(58) Field of Search .................... 370/419, 420, 370/357, 359, 360, 463, 351; 379/399, 398, 394, 413

(56) References Cited

U.S. PATENT DOCUMENTS 5,255,317 * 10/1993 Arai et al. ............................ 379/399
5,598,401 * 1/1997 Blackwell et al. ..................... 379/94
6,002,684 * 12/1999 McVerry ............................... 370/359

* cited by examiner

*Primary Examiner*—Huy D. Vu
*Assistant Examiner*—Kevin C. Harper
(74) *Attorney, Agent, or Firm*—Snell & Wilmer (57) ABSTRACT

The present invention comprises a smart subscriber line interface card (SLIC). The SLIC of the present invention includes a first and a second switch. A data receiver is coupled to a first output of the first switch to receive a user output signal and is adapted to generate a data receiver output therefrom. An ADC (analog to digital converter) is coupled to a second output of the first switch to receive the user output signal and is adapted to generate an ADC output therefrom. A data transmitter is coupled to a first input of the second switch and is adapted to generate a data transmitter output from a received digital network signal and couple the data transmitter output to the first input of the second switch. A DAC (digital to analog converter) is coupled to a second input of the second switch and is adapted to generate a DAC output from the received digital network signal and couple the DAC output to the second input of the second switch. A controller circuit is coupled to the first switch and the second switch and functions by configuring the first and second switch for either efficient data transmission and reception via the data receiver and data transmitter, or conventional communication via the ADC and the DAC.

22 Claims, 5 Drawing Sheets

METHOD AND SYSTEM FOR ACHIEVING IMPROVED DATA TRANSMISSION THROUGH THE PUBLIC SWITCHED TELEPHONE NETWORK

FIELD OF THE INVENTION

The field of the present invention pertains to digital telecommunications. More particularly, the present invention relates to a method and system for increasing data transmission throughput in the public switched telephone network.

BACKGROUND OF THE INVENTION

Digital telecommunications across great distances has become a commonly used and widely adopted method of sharing information and ideas. The widespread adoption of facsimile technology, voice and video teleconferencing, and electronic mail has resulted in the formation of new paradigms of business organization. With the modern telecommunications technology, proximity of location is not nearly as relevant as connectivity bandwidth. Working professionals, governments, businesses, and other segments of the economy are reorganizing themselves around the widespread adoption of point to point telecommunications devices.

Essentially, digital telecommunications have proven to be a far more powerful and compelling method of communication than previous, conventional methods. Communication and exchanges between one user and another distant user occur virtually in real time. For example, a fax machine can communicate information and pictures nearly instantaneously, as opposed to conventional mail. Electronic mail allows one user to send numerous document files and large image files to the distant user immediately. The rise of this new paradigm has led to a huge increase in the demand for point to point digital telecommunications.

The problem, however, is that the public switched telephone network through which the majority of this information passes was not designed to handle high bandwidth digital data. The public switched telephone network (PSTN) was primarily designed for point to point voice communication. However, designers of data modems have attempted to make the best use of this situation, but even so, the vast majority of point to point digital communications across the PSTN proceeds at speeds much slower than the theoretical 64 Kbps limit of the PSTN when using digital switching of PCM channels. Users are demanding faster, reliable 64 Kbps connections.

Figure 1:
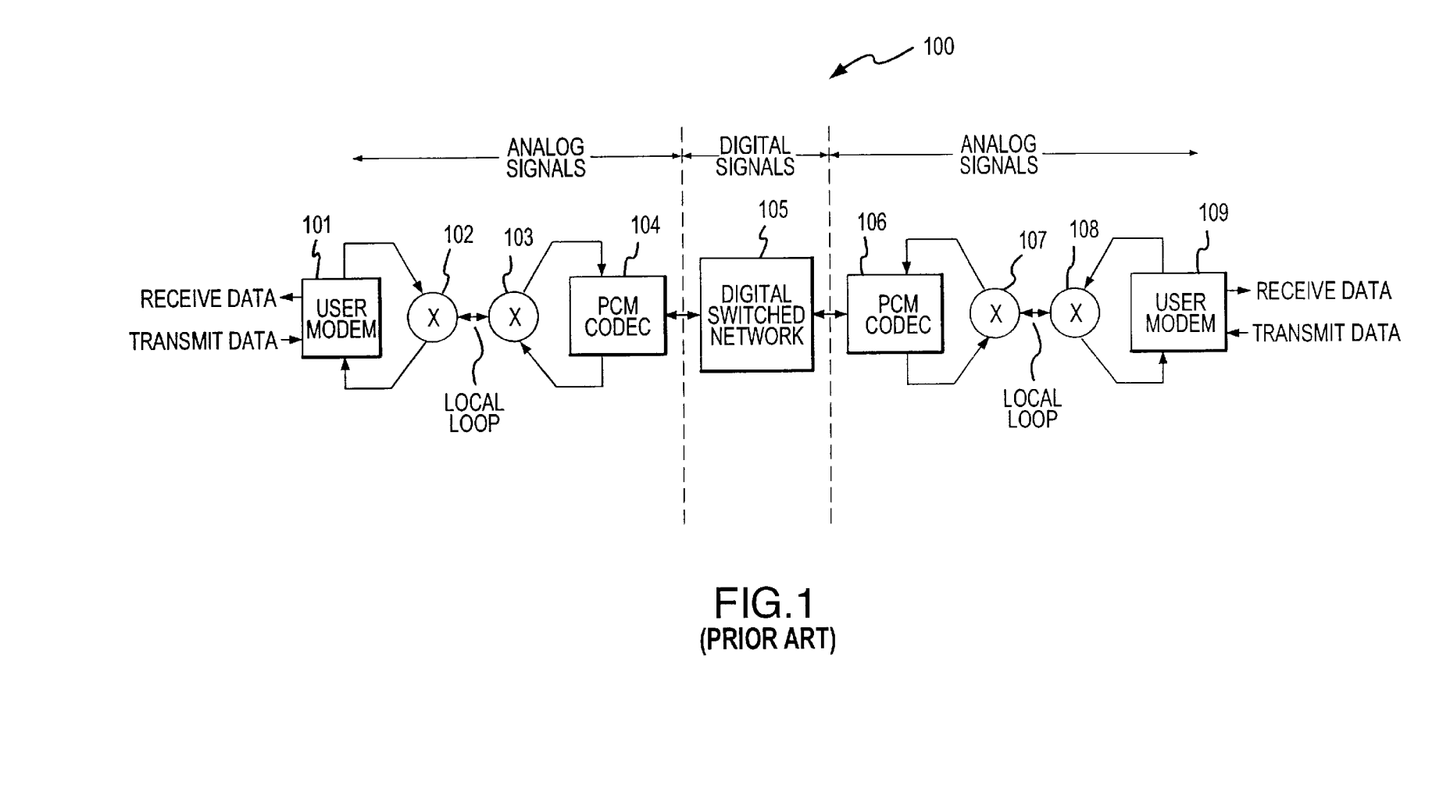
FIG. 1 shows a diagram of a typical communications channel in the public switched telephone network.

Prior Art FIG. 1 shows a diagram of a typical communications channel 100 in the PSTN. The communications channel 100 includes a user modem 101 sending transmit data and downloading receive data to and from a user on the left of FIG. 1 (not shown). User modem 101 is coupled to a 2–4 wire converter 102, and in turn, via a local loop, is coupled to a second 2–4 wire converter 103. In communications channel 100, the two wire line connecting 2–4 wire converter 102 and 2–4 wire converter 103 is referred to as the local loop. The 2–4 wire converter 103 is coupled to a PCM (pulse code modulation) codec 104. The 2–4 wire converter 103 and PCM codec 104 are often integrated into one piece of equipment referred to as a subscriber line interface card. PCM codec 104 is coupled to a digital switched network 105 portion of the PSTN, and in turn, is coupled to a PCM codec 106. PCM codec 106 is coupled to a 2–4 wire converter 107, then via another local loop to a 2–4 wire converter 108, and subsequently to a remote user modem 109. Remote user modem 109 couples received data and transmit data to and from a user on the right of FIG. 1 (not shown).

The signals from the user on the left of FIG. 1 to PCM codec 104 are analog signals. The signals from the user on the right of FIG. 1 to PCM codec 106 are also analog signals. However, the signals that are transmitted and switched across the digital switched network 105 are digital. The analog signals are converted into corresponding digital signals by the digital to analog converters (DACs) and the analog to digital converters (ADCs) of PCM codec 104 and PCM codec 106. In the case of voice communications, the analog signal is a voice waveform and its corresponding digital signal in the PSTN is a sampled representation of the voice waveform, after it is subjected to A (or $\mu$) law compression. In the case of conventional data communication, the analog signal is an analog waveform onto which is modulated the digital data. The corresponding digital signal within the PSTN is a sampled representation of this analog waveform (also after A or $\mu$ law compression).

The 2–4 wire converter 103 and the PCM codec 104 comprise the major portions of a subscriber line interface card. Similarly, 2–4 wire converter 107 and the PCM codec 106 also comprise a subscriber line interface card. The subscriber line interface card (SLIC) functions by converting the user's analog signal into a digital representation of the sampled analog signal after A or $\mu$ law compression. Once converted, the digital signal is transmitted and switched through the digital switched network 105 of the PSTN. At the destination, the digital signal is coupled to another SLIC where it is converted from digital form back into analog form.

If the analog signal is a voice signal, the analog signal is used to drive the speaker of a telephone, recreating the user's voice. If the analog signal is a data signal (e.g., a V.21 modem signal), the digital data is extracted from the analog signal for use by the receiving user's computer system by user modems 101 and 109. Communications channel 100 functions adequately when used to transmit and receive analog information (e.g., voices). However, communications channel 100 proves inefficient when utilized to transmit high bit rate data streams. The present state of the art allows a maximum data rate of 40–50 Kbps for K56-type modems (server to client direction only). The limitation for the latter being caused mainly by the A or $\mu$ law expansion process at the local exchange.

One of the major bottlenecks to high speed data transmission through a communications channel is the presence of prior art SLICs. For example, one of the primary challenges in designing 56 Kbps PCM (pulse code modulation) type modems is accounting for the detrimental effects of the DACs and ADCs contained within the SLICs.

Figure 2:
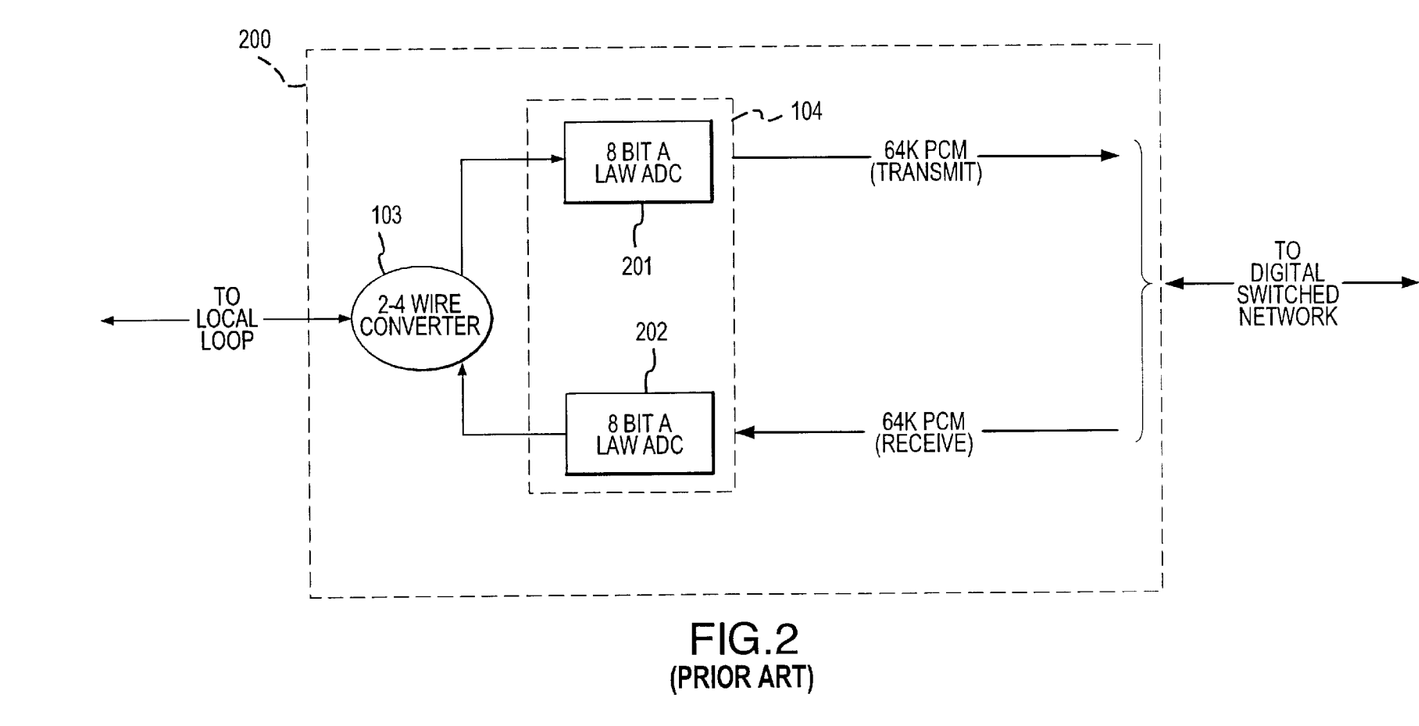
FIG. 2 shows a typical prior art subscriber line interface card.

Prior Art FIG. 2 shows a typical prior art SLIC 200. SLIC 200 includes 2–4 wire converter 103 and PCM codec 104. PCM codec 104 includes an 8 bit A law ADC 201 and an 8 bit A law DAC 202. The 8 bit A law ADC 201 transmits information upstream to the digital switched network as a 64 Kbps digital data stream. The 8 bit A law DAC 202 receives downstream information as a 64 Kbps data stream. While SLIC 200 includes A law DAC 202 and A law ADC 201, those skilled in the art understand that alternatively, SLIC 200 could include a $\mu$ law DAC and $\mu$ law ADC instead.

As is well known in the art, in the downstream direction (e.g., from an internet service provider to a user), 8 bit A law DAC 202 restricts the number of signaling levels from a theoretical maximum of 256 voltage levels. The number of levels actually available are much lower. Many of the signaling levels around the origin are spaced too closely together and are unusable due to DC offset voltage levels and other signal characteristics of the 8 bit A law ADC 202. This forces the user modem 101 to use larger amplitude levels with a corresponding increase in the transmit signal power, as the bit rates increase. Thus, one of the factors limiting the maximum bit rate is the maximum allowable power levels on the local exchange lines. Those desiring more detailed information regarding A law and μ law codec standards are directed to "ITU-T G.711, PULSE CODE MODULATION (PCM) OF VOICE FREQUENCIES, International Telecommunications Union" which is incorporated herein as background material.

One solution presently available to the user is to convert to ISDN (integrated services digital network). However, this requires an expensive hardware change to the SLIC 200 (e.g., the removal and replacement with a new SLIC) and software and other hardware changes to PSTN such that the user's local loop is no longer viewed by the PSTN as a regular analog line. Consequently, ISDN is presently an expensive option for the user. The expense is primarily due to the software changes required within the PSTN and also the fact that an ISDN connection requires a total of 144 Kbps (e.g., basic ISDN 2B+D connection) in both directions, compared to only 64 Kbps full duplex for an analog line. Consequently, ISDN imposes more demands on the local exchange's limited available digital throughput to the next level of switching in the PSTN (e.g., digital switched network 105). The higher 144 KBPS data rate also requires expensive engineering time to check the suitability of the local loop for supporting this rate and to carry out possible modifications to the loop, such as the removal of loading coils.

Thus, what is required is a solution which improves the data transfer bandwidth for users coupled to the PSTN. The required system should require a straight forward and economical change to the hardware of the PSTN and should be relatively easy to implement in comparison to ISDN. The required system should increase the efficiency of modems coupled to the PSTN. Additionally, the required system should be compatible with ordinary analog voice communication and the PSTN should view the upgraded user as an entirely conventional voice-grade service. The present invention provides a novel solution to the above requirements.

SUMMARY OF THE INVENTION

The present invention comprises a method and system for achieving improved data transmission through the public switched telephone network. The system of the present invention includes a smart subscriber line interface card (SLIC). The SLIC of the present invention improves the effective data transfer bandwidth for users coupled to the public switched telephone network (PSTN). The present invention requires a minimum of change to the hardware of the PSTN and is thus relatively easily implemented. The SLIC of the present invention increases the efficiency of modems coupled to the PSTN and is compatible with ordinary analog voice communication. The SLIC of the present invention continues to be viewed by the PSTN as a conventional SLIC, even in its enhanced data communications mode. No software changes are therefore required within the PSTN to accommodate this change, as would be the case had the user upgraded to ISDN service and no local loop testing/modification is necessary.

In one embodiment, the SLIC of the present invention includes a first and a second switch. The first switch receives an outgoing user output signal and couples the user output signal to one of two first switch outputs. The second switch receives user input signals at two inputs and transmits an incoming user input signal from one of the inputs to a user via an output. A data receiver is coupled to the first output of the first switch. The data receiver receives the user output signal and generates a data receiver output therefrom. An ADC is coupled to the second output of the first switch. The ADC receives the user output signal and generates an ADC output therefrom.

A data transmitter is coupled to the first input of the second switch. The data transmitter generates a data transmitter output from an incoming digital network signal and couples the data transmitter output to the first input of the second switch. A DAC is coupled to a second input of the second switch. The DAC generates a DAC output from the incoming digital network signal and couples the DAC output to the second input of the second switch.

To manage the operation of the SLIC of the present invention, a controller circuit is coupled to the first switch and the second switch. The controller circuit functions by configuring the first and second switch for either efficient data transmission and reception or conventional communication. When configuring for efficient data communication, the controller circuit configures the first and second switches to utilize the data receiver and data transmitter for data communications. In this configuration, data transfers to and from the user pass through the data receiver and the data transmitter. When configuring for conventional communication, the controller circuit configures the first and second switches to utilize the ADC and DAC respectively. In this configuration, data transfers to and from the user pass through ADC and DAC, in the same manner as a conventional prior art SLIC.

In this manner, the SLIC of the present invention increases the efficiency of modems coupled to the PSTN while maintaining compatibility with ordinary analog voice communication through the PSTN. In so doing, the present invention improves the effective data transfer bandwidth for users coupled to the PSTN while requiring only a straightforward hardware change.

BRIEF DESCRIPTION OF THE DRAWINGS

The present invention is illustrated by way of example and not by way of limitation, in the figures of the accompanying drawings and in which like reference numerals refer to similar elements and in which.

Prior Art

Prior Art

DETAILED DESCRIPTION OF THE INVENTION

In the following detailed description of the present invention, a method and system for achieving improved data transmission through the public switched telephone network, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

The present invention comprises a smart subscriber line interface card (SLIC) which provides a method and system for achieving improved data transmission through the PSTN. The SLIC of the present invention improves the effective data transfer bandwidth for users coupled to the PSTN. The SLIC can be configured to operate in a conventional manner for voice or conventional data communication or to efficiently transfer data. In so doing, the SLIC of the present invention requires only a minimal change to the hardware of the PSTN and is thus relatively easily implemented. Hence, the SLIC of the present invention increases the efficiency of modems coupled to the PSTN and is compatible with ordinary analog voice and conventional data communication. The present invention and its benefits are further described below.

Figure 3:
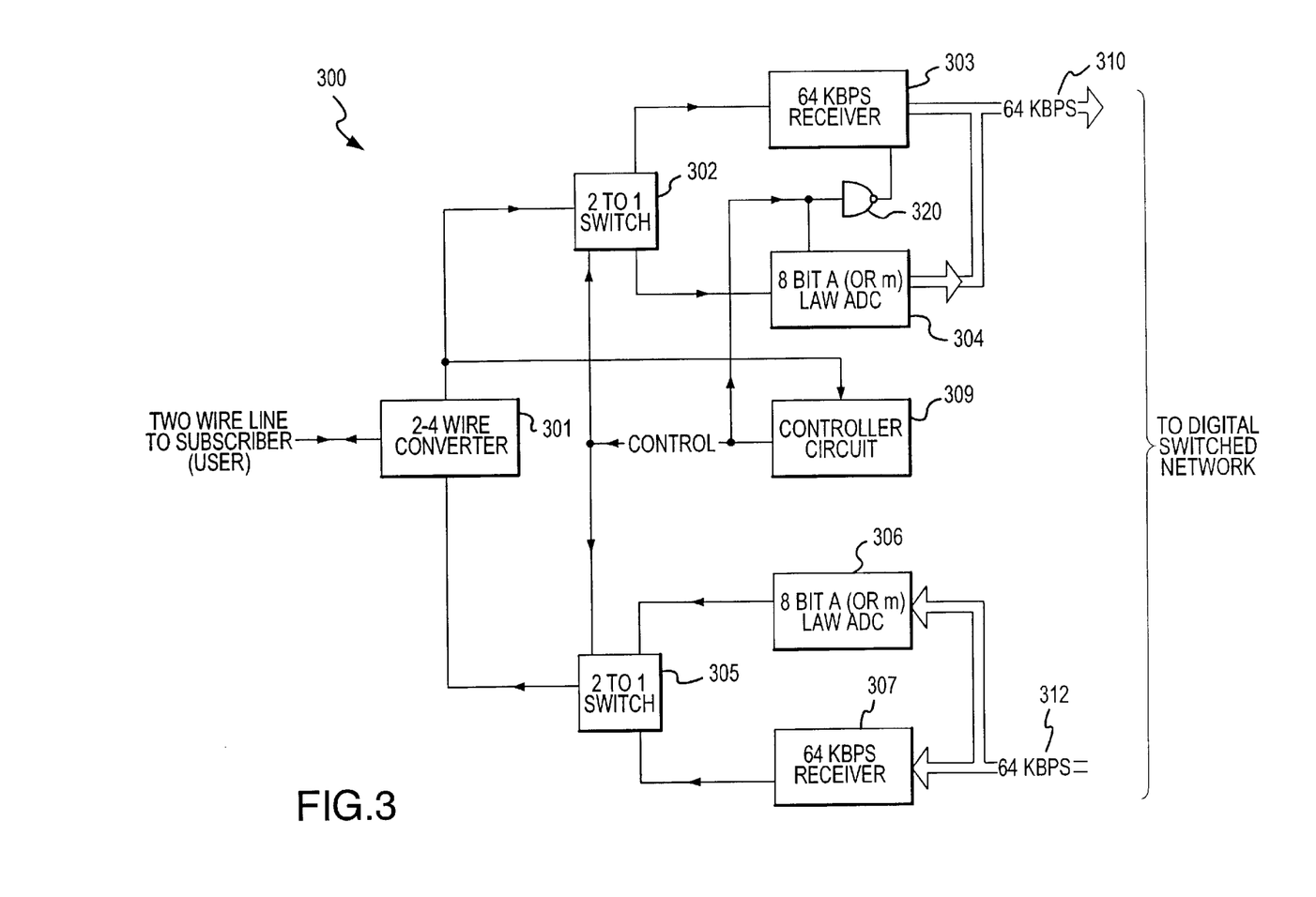
FIG. 3 shows a smart subscriber line interface card in accordance with one embodiment of the present invention.

FIG. 3 shows a smart SLIC 300 in accordance with one embodiment of the present invention. Smart SLIC (hereafter SLIC) 300 includes a 2–4 wire converter 301 coupled to a 2-to-1 switch 302 and a 2-to-1 switch 305. Switch 302 is coupled to a 64 Kbps receiver 303 and an 8 bit A (or $\mu$) law ADC 304. Both the 64 Kbps receiver and the 8 bit A(or $\mu$) law ADC output a 64 Kbps output 310. Switch 305 is coupled to a second 8 bit A (or $\mu$) law DAC 306 and a 64 Kbps transmitter 307. Both the 8 bit A (or $\mu$) law DAC 306 and the 64 Kbps transmitter 307 are coupled to receive a 64 Kbps digital network signal 312.

The 2–4 wire converter 301 is coupled via a two wire line (or local loop) to a subscriber (i.e., a user). The two wire line to the user carries full-duplex information to and from the user. The 2–4 wire converter 301 functions by converting the two wire line information (e.g., the information coming from the user) into a separate one way user input signal and a separate one way user output signal. The user output signal is the information coming from the user to be transmitted out onto the digital switched network (e.g., the PSTN). The user input signal is the information coming from the digital switched network to be transmitted back to the user.

As the user sends information to be transmitted out across the digital switched network, the outgoing user output signal is coupled to switch 302 via 2–4 wire converter 301 and then coupled to either 64 Kbps receiver 303 or 8 bit A (or $\mu$) law ADC 304. When SLIC 300 is configured for efficient data transmission, switch 302 couples the user output signal to 64 Kbps receiver 303. When SLIC 300 is configured for conventional communication, switch 302 couples the user output signal to 8 bit A (or $\mu$) law ADC 304.

When information is received from the digital switched network to be transmitted to the user, the information is received as a 64 Kbps digital network signal at both the 8 bit A (or $\mu$) law DAC 306 and the 64 Kbps transmitter 307. When SLIC 300 is configure for efficient data transmission, the 64 Kbps transmitter 307 output is coupled to the 2–4 wire converter 301 by switch 305. When SLIC 300 is configured for conventional communication, the 8 bit A (or $\mu$) law DAC 306 output is coupled to the 2–4 wire converter 301. The resulting user input signal (e.g., either the 8 bit A (or $\mu$) law DAC 306 output or the 64 Kbps transmitter 307 output) is coupled to the user via the 2–4 converter 301 and the two wire line.

Referring still to FIG. 3, SLIC 300 of the present invention also includes a controller circuit 308. Controller circuit 308 is coupled to the two wire line to the user via 2–4 wire converter 301 to receive a control signal input. Controller circuit 308 is coupled both to switch 302 and switch 305 to configure them for either efficient data transmission or conventional communication. Controller circuit 308 is coupled to 8 bit A (or $\mu$) law ADC 304 and is also coupled via inverter 320 to 64 Kbps receiver 303.

To configure SLIC 300 of the present invention for efficient data transmission, controller circuit 308 configures switch 302 to couple the user input signal to 64 Kbps receiver 303 and enables the output of 64 Kbps receiver 303 via inverter 320, while tri-stating the output of 8 bit A (or $\mu$) law ADC 304. Similarly, controller circuit 308 switches out 8 bit A (or $\mu$) law DAC 306 by configuring switch 305 to couple the output of 64 Kbps transmitter 307 to the 2–4 wire converter 301. Thus, SLIC 300 is configured for efficient data communication from the user end, rather than from the PSTN side.

This configuration effectively switches out 8 bit A (or $\mu$) law ADC 304 and 8 bit A (or $\mu$) law DAC 307 from the communications path of the user. 64 Kbps receiver 303 and 64 Kbps transmitter 307 are designed to effectively utilize the 64 Kbps bandwidth to and from the digital switched network. This eliminates the limitations of 8 bit A (or $\mu$) law DAC 304 8 bit A (or $\mu$) law ADC 304 and 8 bit A (or $\mu$) law DAC 306, thereby allowing the user to communicate upstream at the full 64 Kbps rate and download from the digital switched network at the full 64 Kbps rate. Many new data transmission schemes are now made possible by this method. The various schemes can be implemented, for example, by modifying the characteristics of 64 Kbps receiver 303 and 64 Kbps transmitter 307 in conjunction with new telecommunications equipment utilized by the user.

To configure SLIC 300 of the present invention for conventional communications, 8 bit A (or $\mu$) law ADC 304 and 8 bit A (or $\mu$) law DAC 306 are switched back into the user's communications path. This is also the "default" or "fail-safe" setting of SLIC 300. Controller circuit 308 configures switch 302 and switch 305 to select 8 bit A (or $\mu$) law ADC 304 and 8 bit A (or $\mu$) law DAC 306 respectively. Controller circuit 308 also enables the output of 8 bit A (or $\mu$) law ADC 304 while tri-stating the output of 64 Kbps receiver 303.

This configuration causes SLIC 300 to function as a conventional prior art SLIC. The limitations of 8 bit A (or $\mu$) law ADC 304 and 8 bit A (or $\mu$) law DAC 306 are present. The SLIC behaves as if it were a standard prior art SLIC. This ensures compatibility with prior art voice communication and prior art modem communication (e.g., V.32 and V.34 industry standard protocols).

It should be appreciated that 8 bit A (or $\mu$) law ADC 304 and 8 bit A (or $\mu$) law DAC 306 can be either "$\mu$ law" or "A law" based. A law codecs (e.g., voice encoders or decoders) are standard in some countries (e.g., Europe) and $\mu$ law codecs are standard in others (e.g., the United States). The present invention is readily suited to functioning with ADCs and DACs adhering to either standard.

Referring still to FIG. 3, in the present embodiment, the configuration and function of SLIC 300 is controlled by the user. Controller circuit 308 is coupled to the user via 2–4 wire converter 301 and the two wire line. The user (e.g., the user end equipment, such as a modem, fax, or the like) switches SLIC 300 into its "efficient data transmission mode" by sending a unique control word down the two wire line. This unique control word indicates to controller 308 that the user is equipped with technology compatible with the efficient data transmission mode of the present invention and causes controller circuit 308 to appropriately configure SLIC 300. If the user is not properly equipped, or if the information coming through the two wire line is simple voice information, controller circuit 308 leaves SLIC 300 in a "default" conventional mode. Thus, in the present embodiment, SLIC 300 configuration is controlled via the user end. This helps ensure compatibility with the PSTN (e.g., the user is aware of the state or version of his telecommunications equipment).

Hence, the SLIC 300 of the present invention can function as a simple one for one replacement for a conventional prior art SLIC. For example, a technician from a phone company can install the system of the present invention by simply pulling the prior art SLIC from the local exchange and installing the SLIC 300 in its place. No further changes to the PSTN would be required. Unlike ISDN, for example, SLIC 300 requires the same 64 Kbps of full duplex data as a regular, unmodified analog phone line.

Figure 4:
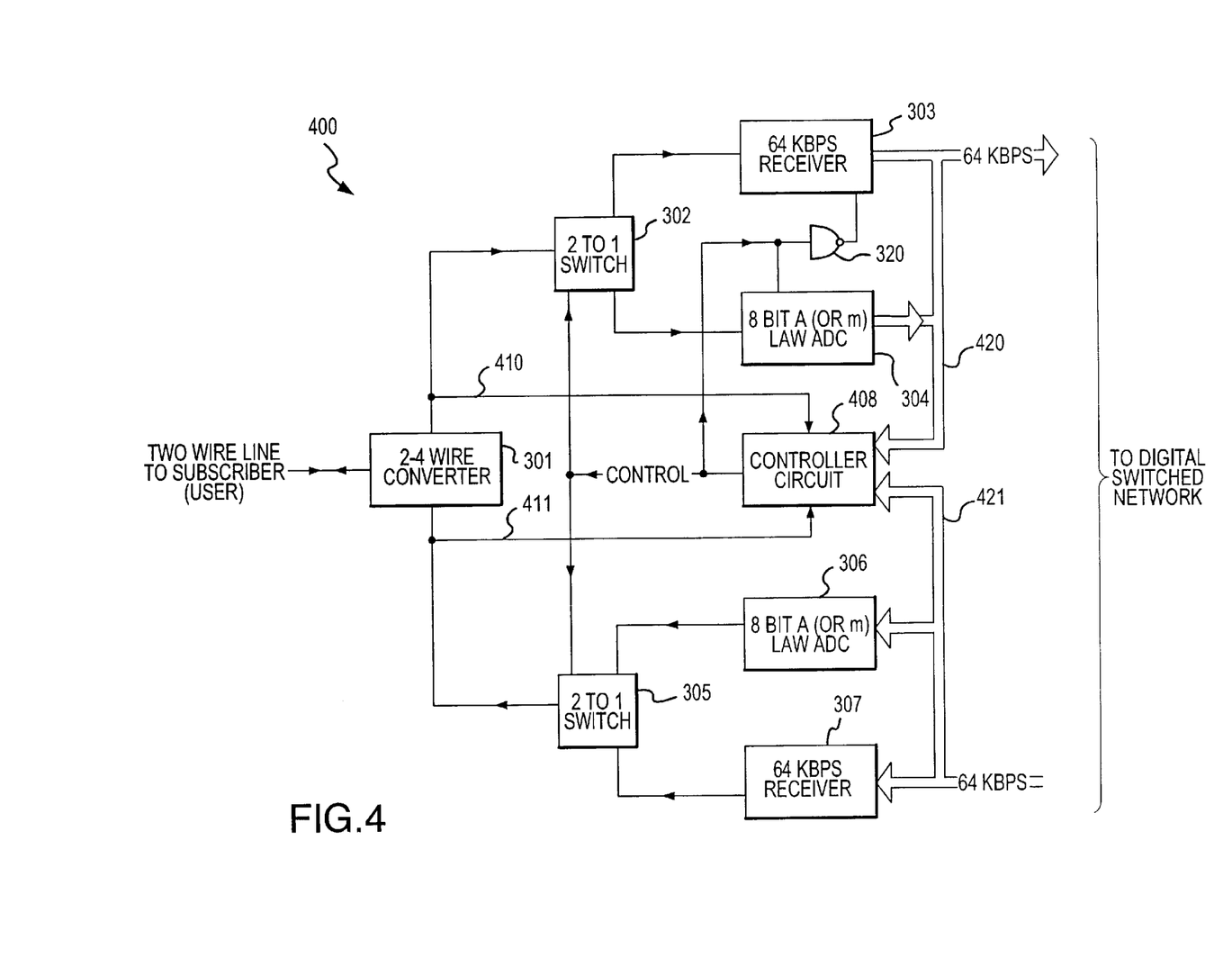
FIG. 4 shows a more versatile and more complex subscriber line interface card in accordance with another embodiment of the system of the present invention.

Referring now to FIG. 4, a SLIC 400 in accordance with a more complex, more versatile embodiment of the system of the present invention is shown. SLIC 400 is similar to SLIC 300 in composition and operation, except for its configuration features. In the present embodiment, SLIC 400 includes a controller circuit 408, as opposed to the controller circuit 308 of SLIC 300. Controller circuit 408 is coupled to the two wire line to the user via lines 410, 411, and the 2–4 wire converter 301. Controller circuit 408 is also coupled to the digital switched network via the 64 Kbps streams 420 and 421.

SLIC 400 can be switched into the efficient data transmission mode from the user end, as with SLIC 300. Additionally, SLIC 400 can be switched into efficient data transmission mode from the digital switched network end. Line 411 couples configuration instructions received from the digital switched network to controller circuit 408, while line 410 couples configuration instructions received from the user end. In this manner, controller circuit 408 can configure SLIC 400 in response to instructions received from the user or instructions received from a resource on the PSTN (e.g., a server coupled to the PSTN via a T-1 line).

In addition, SLIC 400 can be switched directly from digital instructions transmitted onto or received from the digital switched network. Controller circuit 408 is coupled to 64 Kbps streams 420 and 421. These streams carry information in a digital form. In contrast, lines 410 and 411 carry information in an analog form (e.g., V.21 signals). By receiving the 64 Kbps streams 420 and 421, controller circuit 408 can immediately recognize digital configuration instructions (e.g., unique digital words).

The modifications included within SLIC 400 allow the implementation of additional configuration and data transmission schemes. SLIC 400 can be configured from the user end or the digital switched network end. The configuration instructions can be fully digital or analog. Hence, SLIC 400 provides a more versatile implementation of the system of the present invention while SLIC 300 provides a streamlined, less complex implementation.

Figure 5:
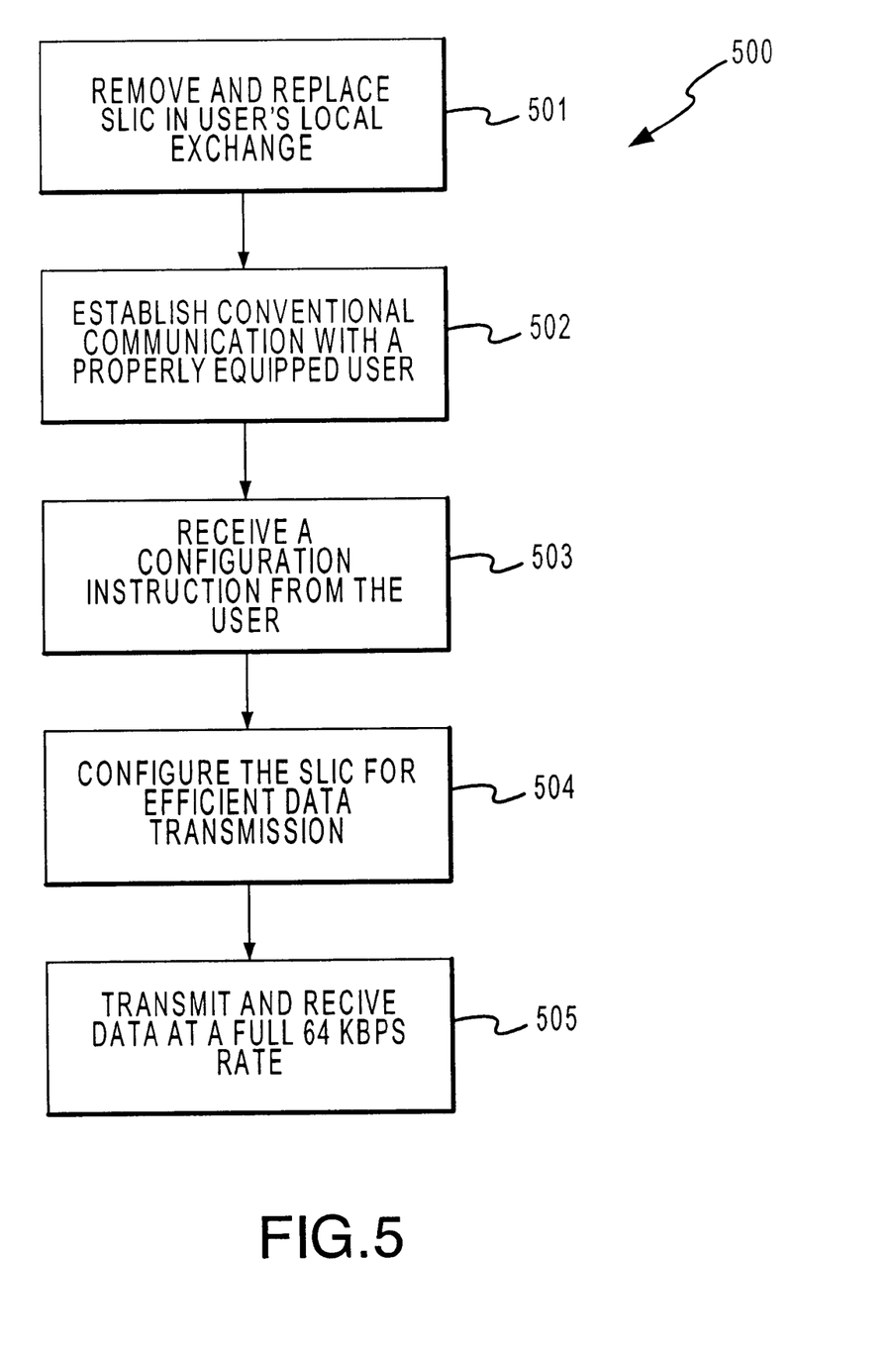
FIG. 5 shows a flow chart of the steps of a process in accordance with one embodiment of the present invention.

Referring now to FIG. 5, a flow chart of the steps of a process 500 in accordance with one embodiment of the present invention is shown. Process 500 is the case where a user of a modem in accordance with the present invention communicates with a similarly equipped user. The users transmit and receive data at the full 64 Kbps rate supported by the SLIC of the present invention (e.g., SLIC 300), through the regular PSTN.

Process 500 begins in step 501 where a prior art SLIC in a local exchange is replaced with a SLIC in accordance with the present invention. As described above, the SLIC of the present invention is a pin for pin replacement for the prior art SLIC. After the prior art SLIC is removed and replaced, no further changes to the PSTN hardware or software are required.

In step 502, conventional communications are established with a second user via the PSTN. Both users are coupled to the PSTN via SLICs in accordance with the present invention. One user initiates a normal analog communications channel with the second user. This initial communication follows the standard V.21 protocols, and during this time, both users indicate to each other via V.21 that they can implement the new, improved 64 Kbps data mode.

In step 503, the SLIC receives a configuration instruction from one of the users. As described above, the configuration instruction is coupled to the SLIC via the standard two wire connection from the user. This instruction causes a controller circuit within the SLIC to configure the SLIC for efficient data transmission. The configuration instruction is comprised of, for example, a unique digital word. The configuration instruction is transmitted by both users and is recognized by their respective SLICs.

In step 504, the SLIC is configured for efficient data transmission. The controller circuit within the SLIC switches out the A law (or $\mu$ law) ADC and DAC and switches in the 64 Kbps receiver and transmitter. The SLICs of both users are configured in this manner.

In step 505, both users transmit and receive data at 64 Kbps. Their respective modems have been transformed from V.21 modems into 64 Kbps digital wide band modems by the system of the present invention. The limitations of the ADCs and DACs in their respective SLICs are bypassed. Full duplex, 64 Kbps communication can now take place between the users.

Thus, the SLIC of the present invention improves the effective data transfer bandwidth for users coupled to the public switched telephone network (PSTN). The present invention requires a minimum of change to the hardware of the PSTN and is thus relatively easily implemented. The SLIC of the present invention increases the efficiency of modems coupled to the PSTN and is compatible with ordinary analog voice communication.

The present invention, a method and system for achieving improved data transmission through the public switched telephone network, is thus disclosed. While the present invention has been described in particular embodiments, it should be appreciated that the present invention should not be construed as limited by such embodiments, but rather construed according to the below claims.

What is claimed is:

1. A subscriber line interface card for enhanced point to point communication across the public switched telephone network, comprising:

a first switch adapted to receive a user output signal and couple the user output signal to a first output or a second output;

a data receiver coupled to the first output of the first switch to receive the user output signal, the data receiver adapted to generate a data receiver output from the user output signal when the user output signal is coupled to the data receiver by the first switch;

an ADC (analog to digital converter) coupled to the second output of the first switch to receive the user output signal, the ADC adapted to generate an ADC output from the user output signal when the user output signal is coupled to the ADC by the first switch;

a second switch adapted to transmit a user input signal, the user input signal received via a first input or a second input;

a data transmitter coupled to the first input to the second switch, the data transmitter adapted to generate a data transmitter output from a received digital network signal and couple the data transmitter output to the first input of the second switch;

a DAC (digital to analog converter) coupled to the second input of the second switch, the DAC adapted to generate a DAC output from the received digital network signal and couple the DAC output to the second input of the second switch; and a controller circuit coupled to the first switch and the second switch, the controller circuit adapted to configure the first switch and second switch for efficient data transmission and reception via the data receiver and data transmitter, or configure the first switch and second switch for conventional communication via the ADC and the DAC.

2. The subscriber line interface card from claim 1 wherein the data receiver further includes a 64 Kbps data receiver adapted to generate the data receiver output from the user output signal, the data receiver output coupled to the public switched telephone network.

3. The subscriber line interface card from claim 1 wherein the data transmitter further includes a 64 Kbps data transmitter adapted to receive a 64 Kbps data stream from the public switched telephone network and generate the data transmitter output therefrom.

4. The subscriber line interface card from claim 1 wherein the ADC further includes either an 8 bit A law analog to digital converter adapted to generate the ADC output, or an 8 bit $\mu$ law analog to digital converter adapted to generate the ADC output.

5. The subscriber line interface card from claim 1 wherein the DAC further includes either an 8 bit A law digital to analog converter adapted to generate the DAC output, or an 8 bit $\mu$ law digital to analog converter adapted to generate the DAC output.

6. The subscriber line interface card from claim 1 wherein the controller circuit causes the first switch and the second switch to switch out the ADC and the DAC, to configure the subscriber line interface card for efficient data transmission.

7. The subscriber line interface card from claim 1 wherein the controller circuit causes the first switch and the second switch to switch out the data transmitter and the data receiver to configure the subscriber line interface card for conventional communication.

8. The subscriber line interface card from claim 1 wherein the controller circuit is adapted to receive a configuration instruction from a user end of the subscriber interface card.

9. The subscriber line interface card from claim 1 wherein the controller circuit is adapted to receive a configuration instruction from either a user end or a digital switched network end of the subscriber interface card.

10. A subscriber line interface card for providing full duplex 64 Kbps data communication across the public switched telephone network, comprising:

a data receiver coupled to receive a user output signal from a user and adapted to generate a data receiver output therefrom;

an ADC (analog to digital converter) coupled to receive the user output signal and adapted to generate an ADC output therefrom;

a data transmitter adapted to generate a data transmitter output from a received digital network signal and couple the data transmitter output to the user;

a DAC (digital to analog converter) adapted to generate a DAC output from the received digital network signal and couple the DAC output to the user; and a controller circuit, the controller circuit adapted to configure the data receiver and data transmitter for efficient data transmission and reception by transmitting the user output signal via the data receiver and coupling the data transmitter output to the user, the controller circuit further adapted to configure the ADC and the DAC for conventional communication by transmitting the user output signal via the ADC and coupling the DAC output to the user.

11. The subscriber line interface card of claim 10 further comprising:

a first switch coupled to the data receiver, the ADC, and the controller circuit, the first switch adapted to receive the user output signal and couple the user output signal to either the data receiver or the ADC;

a second switch coupled to the data transmitter, the DAC, and the controller circuit, the second switch adapted to transmit either the data transmitter output or the DAC output to the user; and the controller circuit coupled to the first switch and the second switch, the controller circuit adapted to configure the first switch and second switch for efficient data transmission and reception by transmitting data via the data receiver and data transmitter, or for conventional communication by transmitting data via the ADC and the DAC.

12. The subscriber line interface card from claim 11 wherein the data receiver further includes a 64 Kbps data receiver adapted to generate the data receiver output from the user output signal, the data receiver output coupled to the public switched telephone network.

13. The subscriber line interface card from claim 11 wherein the data transmitter further includes a 64 Kbps data transmitter adapted to receive a 64 Kbps data stream from the public switched telephone network and generate the data transmitter output therefrom.

14. The subscriber line interface card from claim 11 wherein the ADC further includes either an 8 bit A law analog to digital converter adapted to generate the ADC output, or an 8 bit $\mu$ law analog to digital converter adapted to generate the ADC output.

15. The subscriber line interface card from claim 11 wherein the DAC further includes either an 8 bit A law digital to analog converter adapted to generate the DAC output, or an 8 bit $\mu$ law digital to analog converter adapted to generate the DAC output.

16. The subscriber line interface card from claim 11 wherein the controller circuit configures the first switch and the second switch to switch out the ADC and the DAC to configure the subscriber line interface card for efficient data transmission.

17. The subscriber line interface card from claim 11 wherein the controller circuit configures the first switch and the second switch to switch out the data transmitter and the data receiver to configure the subscriber line interface card for conventional communication.

18. The subscriber line interface card from claim 11 wherein the controller circuit is adapted to receive a configuration instruction from a user end of the subscriber interface card.

19. The subscriber line interface card from claim 11 wherein the controller circuit is adapted to receive a configuration instruction from either a user end or a digital switched network end of the subscriber interface card.

20. A method for providing full duplex 64 Kbps data communication across the public switched telephone network by using a subscriber line interface card, the method comprising the steps of:

a) replacing a conventional subscriber line interface card from first user's local exchange with a subscriber line interface card;

b) establishing conventional communication between the first user and a second user via the subscriber line interface card;

c) receiving a configuration instruction in the subscriber line interface card from the first user; and receiving a configuration instruction in the subscriber line interface card from the second user;

d) configuring the subscriber line interface card for efficient data transmission; and e) transmitting and receiving data between the first user and the second user at an efficient data transmission rate of approximately 64 Kbps.

21. A method for providing full duplex 64 Kbps data communication across the public switched telephone network by using a subscriber line interface card, the method comprising the steps of:

a) replacing a conventional subscriber line interface card from first user's local exchange with a subscriber line interface card;

b) establishing conventional communication between the first user and a second user via the subscriber line interface card;

c) receiving a configuration instruction in the subscriber line interface card from the first user;

d) configuring the subscriber line interface card for efficient data transmission, and switching an A law analog to digital converter and an A law digital to analog converter, included in the subscriber line interface card, out of the transmitting and receiving path between the first user and the second user; and e) Transmitting and receiving data between the first user and the second user at an efficient data transmission rate of approximately 64 Kbps.

22. A method for providing full duplex 64 Kbps data communication across the public switched telephone network by using a subscriber line interface card, the method comprising the steps of:

a) replacing a conventional subscriber line interface card from first user's local exchange with a subscriber line interface card;

b) establishing conventional communication between the first user and a second user via the subscriber line interface card;

c) receiving a configuration instruction in the subscriber line interface card from the first user;

d) configuring the subscriber line interface card for efficient data transmission, and switching a $\mu$ law analog to digital converter and a $\mu$ law digital to analog converter, included in the subscriber line interface card, out of the transmitting and receiving path between the first user and the second user; and e) transmitting and receiving data between the first user and the second user at an efficient data transmission rate of approximately 64 Kbps.

* * * * *